Figure 2:
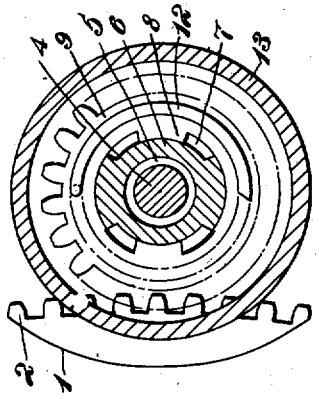

May 27, 1930. W. G. MYLIUS Re. 17,679

STARTING MECHANISM FOR AUTOMOBILES

Original Filed March 16, 1915

WITNESSES:

J. P. Wurmb.
J. R. Langley

INVENTOR
Walter G. Mylius.
BY
Wesley G. Carr
ATTORNEY

Reissued May 27, 1930

Re. 17,679

UNITED STATES PATENT OFFICE

WALTER G. MYLIUS, OF WILKINSBURG, PENNSYLVANIA, ASSIGNOR, BY MESNE ASSIGNMENTS, TO ECLIPSE MACHINE COMPANY, OF ELMIRA HEIGHTS, NEW YORK, A CORPORATION OF NEW YORK

STARTING MECHANISM FOR AUTOMOBILES

Original No. 1,247,138, dated November 20, 1917, Serial No. 14,860, filed March 16, 1915. Application for reissue filed February 19, 1921. Serial No. 446,519.

My invention relates to starting mechanisms for automobiles, and it has particular reference to such mechanisms as embody screw-threaded shafts for controlling the operative connections of starting motors to the engines of automobiles or other motor vehicles.

The object of my invention is to provide a simple and efficient arrangement whereby the operative connection of a starting motor to an engine shaft may be readily accomplished without shock to the coacting parts.

In the operation of starting mechanisms of the same general character as that of my invention, it may occur that the teeth of the coacting gear wheels are not in register when these parts are brought into engagement. Because of the substantially rigid relation of the pinion and the screw-threaded shaft which actuates it longitudinally, into mesh with the usual flywheel gear, and because of the engagement of the pinion with the flywheel gear, there can be little or no angular movement of the pinion under such conditions, and damage to the ends of the coacting gear teeth is likely to result.

In order to obviate the above defect, it has been proposed to employ a relatively stiff spring between the screw-threaded shaft and the motor in order to allow a rotative movement of the pinion to place the teeth in proper register when they are intially engaged. Such an arrangement possesses the disadvantage that the spring forms a part of the driving connection and is, therefore, likely to be broken in case of back-firing of the engine or from other causes.

It has been proposed, further, to interpose a spring between the pinion and the driving shaft. The disadvantage of such an arrangement lies in the fact that energy, which is stored in the spring when the engine approaches one of its compression points, is released when the compression point is passed and the pinion is rotated faster than the screw-threaded shaft. The result is to tend to automatically disconnect the motor from the engine upon the passing of each compression point.

According to the present invention, the pinion is connected to the screw-threaded shaft through a sleeve which is provided with internal screw threads, and upon which the pinion is mounted for longitudinal slidable movement. The pinion is connected to the sleeve by a spiral spring which normally maintains a spaced relation between the pinion and a flange on the sleeve. The spring also maintains the pinion in an intermediate position relatively to a lost-motion driving connection between the sleeve and the pinion. By means of this arrangement, the pinion may rotate in either direction relatively to the screw-threaded sleeve in order that the coacting gear teeth may properly register. A relative longitudinal movement of these parts is also provided in order that the pinion may be yieldingly pressed into mesh with the flywheel gear.

Figure 1:
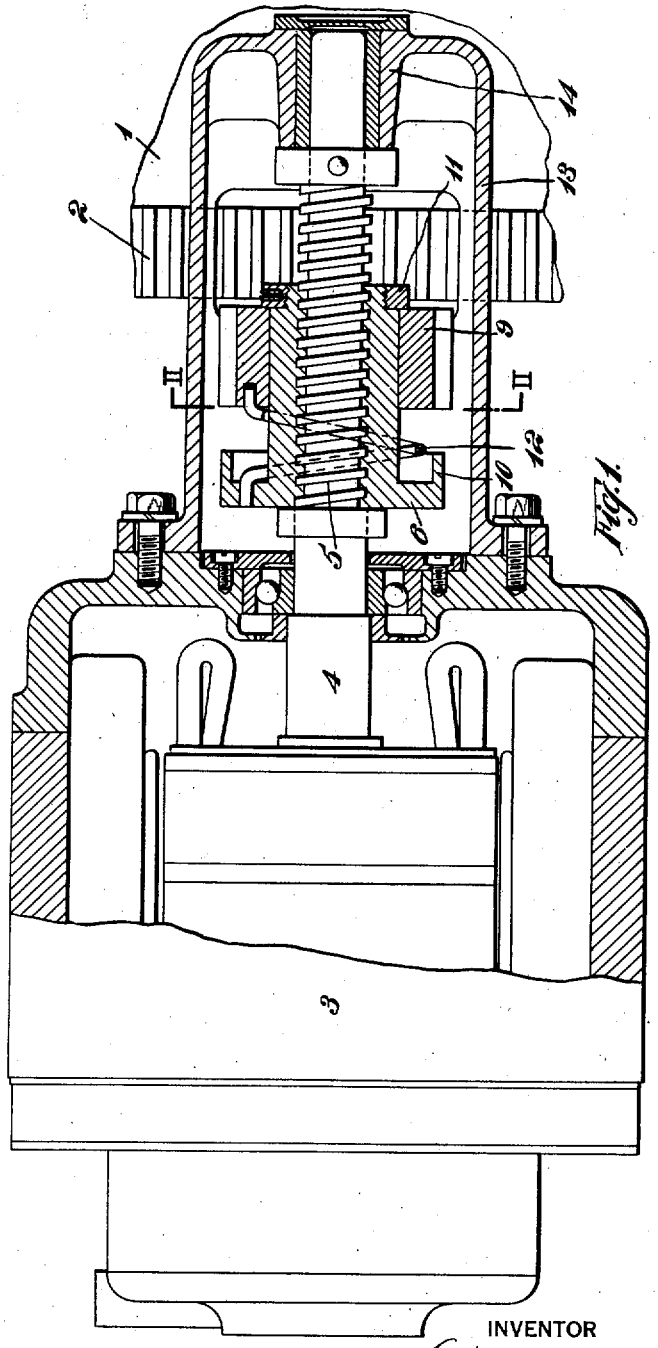

The details of my invention are described in connection with the accompanying drawings in which Fig. 1 is a side view, partially in elevation and partially in section, of an engine flywheel with my invention applied thereto. Fig. 2 is a view, in section, on line II—II of Fig. 1.

An engine flywheel 1, only a portion of which is shown, is provided with gear teeth 2. A starting motor 3, which is here shown as an electric motor, has an armature shaft 4 provided with a screw-threaded portion 5. A sleeve 6 is mounted upon the screw-threaded portion 5 and is provided with internal screw threads for coacting therewith. The sleeve 6 is provided with longitudinally extending grooves 7 which are occupied by toothed portions 8 of a pinion 9 that is mounted on the sleeve. The grooves 7 are materially wider than the coacting teeth 8 in order to provide a lost-motion connection between the sleeve and the pinion.

The pinion 9 is longitudinally movable relatively to the sleeve 6, its movement in one direction being limited by a flange 10 that is integral with the sleeve 6 and, in the other direction, by a collar member 11. A coil spring 12, which is connected, at its respective extremities, to the flange 10 and the pinion 9, operates to normally retain the pinion at one end of the sleeve 6 in engagement with the collar member 11 and in such an angular position relatively to the sleeve that the toothed projections 8 occupy substantially a central position in the grooves 7. The entire mechanism is inclosed by a housing 13 having, at its outer end, a bearing 14 which supports the armature shaft 4.

Normally, the several parts are in their respective illustrated positions, with the sleeve 6 at the inner end of the screw-threaded shaft and the pinion 9 out of engagement with the gear teeth 2. To start the engine, power may be supplied to the motor by any suitable means (not shown). The armature shaft will be driven at a rapidly increasing speed in a clockwise direction, as viewed from the right. Because of the inertia of the sleeve 6, the screw-threaded portion 5 rotates relatively to it and the pinion 9. The sleeve 6 and the pinion 9 will be actuated to the right to effect engagement of the pinion with the gear teeth 2.

If the coacting teeth are not in proper register, the pinion 9 may rotate in either direction relatively to the sleeve 6 in order to adjust itself to the position of the gear teeth 2. When the sleeve 6 reaches the outer end of the screw-threaded portion 5, the pinion 9 will have been fully meshed with the gear teeth 2. The sleeve 6 and the pinion 9 will thereupon rotate with the shaft 4 to drive the flywheel to crank the engine.

When the engine starts under its own power, the flywheel 2 will rotate at a higher rate of speed than that at which it was driven by the motor 3 through the mechanism above described. The pinion 9 will then be driven at a higher rate of speed than the armature shaft 4, and the pinion and the sleeve 6 will overrun the screw-threaded portion 5. This relative movement causes the sleeve 6 to be actuated to the left to its illustrated position, and the pinion 9 will accordingly be disengaged from the gear teeth 2, either by the tension of the spring 12 or by its engagement with the collar member 11. The circuit of the motor may be broken by the operator at any time after the engine has started.

The advantages of a starting mechanism constructed in accordance with my invention will be readily appreciated by those skilled in the art to which my invention appertains. The operation of connecting the motor to the engine may be accomplished with almost an entire absence of shock, regardless of the relative positions of the co-acting parts. This result is obtained by arranging the pinion for both angular and longitudinal movements, relatively to the member which actuates it into and out of mesh with the flywheel. The provision of the spring for connecting the pinion to the sleeve insures that that pinion is normally in a position for allowing movement in either direction, and that considerable movement of the sleeve may occur relatively to the pinion.

While I have shown and described a specific embodiment of my invention, it is understood that such modifications may be made as fall within the limits of the appended claims without departing from the spirit of my invention.

I claim as my invention:

1. In a starting mechanism, the combination with an engine member, and a motor, of a screw-threaded shaft operatively connected to said motor, a pinion adapted to be actuated into and out of engagement with said engine member upon relative rotative movements of said shaft and said pinion, and means for yieldingly connecting said pinion to said shaft for movements relatively to each other independently of said relative rotative movements and for controlling the engagement of said pinion with said engine member according as the motor constitutes the driving or the driven member.

2. In a starting mechanism, the combination with an engine member, a motor and a pinion, of a shaft connected to said motor having a screw-threaded portion for actuating said pinion into and out of engagement with said engine member upon relative rotative movements of said shaft and said pinion, and means for connecting said pinion to said shaft for rotative movements relatively thereto independently of said screw-threaded portion.

3. In a starting mechanism, the combination with an engine member, and a motor, of a screw-threaded shaft operatively connected to said motor, an element for coacting with the engine member, and means for providing a yielding lost-motion connection between said element and said shaft for independent longitudinal movements relatively to each other and for controlling the engagement of said element with said engine member according as the motor constitutes the driving or the driven member.

4. In a starting mechanism, the combination with an engine member, a rotatable shaft, and a pinion on the shaft, of means for effecting the engagement and disengagement of said pinion with said member, said means comprising said shaft, a member having a screw-threaded connection thereto and a yielding connection to said pinion.

5. In a starting mechanism, the combination with an engine member, a rotatable shaft having a screw-threaded portion, and a pinion on the shaft, of a member having a lost-motion connection to said pinion and coacting with said screw-threaded portion to actuate said pinion into and out of engagement with the engine member.

6. In a starting mechanism, the combination with an engine member, and a motor, of automatic means for operatively connecting said motor to said engine member, said means comprising the motor shaft, a member having a screw-threaded engagement therewith, and an element movable angularly and longitudinally relatively to the second member and having a yielding connection thereto.

7. In a starting mechanism, the combination with an engine member, a motor and a pinion, of a shaft connected to said motor having a screw-threaded portion for actuating said pinion into and out of engagement with said engine member upon relative rotative movements of said shaft and said pinion, and means for connecting said pinion to said shaft for longitudinal movements relatively thereto independently of said screw-threaded portion.

8. A drive for engine starters comprising a rotatable screw shaft, a screw member threaded thereon for rotary movement therewith and longitudinal movement thereof, and a driving member mounted on the screw member for rotary movement therewith and longitudinal movement into engagement with a member of the engine to be started, and means yieldingly connecting said screw member and driving member to permit longitudinal movement of the driving member with respect to the screw member in case of abutting of the driving member and engine member and thereby facilitate their engagement and avoid shock of contact.

9. A drive for engine starters comprising a rotatable screw shaft, a screw member threaded thereon for rotary movement therewith and longitudinal movement thereof, and a driving member mounted on the screw member for rotary movement therewith and longitudinal movement into engagement with a member of the engine to be started, said driving member being normally positioned at one end of the screw member, and a light spring operatively connecting said screw and driving members and acting in a longitudinal direction but permitting longitudinal movement of the driving member with respect to the screw member in case of the abutting of the latter with the engine member, thereby facilitating their engagement and avoiding shock of contact.

10. A drive for engine starters comprising a rotatable screw shaft, a screw member threaded thereon for rotary movement therewith and longitudinal movement thereof, and a driving member mounted on the screw member for rotary movement therewith and longitudinal movement into engagement with a member of the engine to be started and also mounted thereon for a limited rotary movement thereof, and yielding means tending to resist such latter rotary movement and longitudinal movement of the driving member with respect to the screw member.

In testimony whereof I have hereunto subscribed my name this 17th day of February, 1921.

WALTER G. MYLIUS.